(12) United States Patent
Nemazi et al.

(10) Patent No.: US 7,040,023 B2
(45) Date of Patent: May 9, 2006

(54) TOOLLESS BLADE HOLDER FOR A RECIPROCATING TOOL

(75) Inventors: John E. Nemazi, Bloomfield Hills, MI (US); Kwok Ting Mok, Cityone Shatin (HK)

(73) Assignee: Eastway Fair Company Limited, Tortola (VG)

( * ) Notice: Subject to any disclaimer, the term of this patent is extended or adjusted under 35 U.S.C. 154(b) by 161 days.

(21) Appl. No.: 10/303,425

(22) Filed: Nov. 25, 2002

(65) Prior Publication Data

US 2004/0098870 A1    May 27, 2004

(51) Int. Cl.
*B27B 19/00*    (2006.01)

(52) U.S. Cl. .............................. 30/392; 30/337; 279/71; 279/81

(58) Field of Classification Search ................ 30/392, 30/337–339, 513, 369, 905, 75–76, 78–81; 279/75–76, 905, 78–81; 403/DIG. 6; 83/699.21
See application file for complete search history.

(56) References Cited

U.S. PATENT DOCUMENTS

| | | | |
|---|---|---|---|
| 3,583,716 A | | 6/1971 | Daniel, Jr. |
| 3,823,473 A | | 7/1974 | Hoffman |
| 4,106,181 A | * | 8/1978 | Mattchen .................... 29/450 |
| 5,265,343 A | * | 11/1993 | Pascaloff .................... 30/339 |
| 5,333,523 A | * | 8/1994 | Palm ........................ 81/177.85 |
| 5,458,346 A | | 10/1995 | Briggs |
| 5,487,221 A | | 1/1996 | Oda et al. |
| 5,573,255 A | * | 11/1996 | Salpaka .......................... 279/75 |
| 5,575,071 A | * | 11/1996 | Phillips et al. ................. 30/392 |
| 5,601,380 A | * | 2/1997 | Guthrie et al. ........... 403/359.3 |
| 5,609,603 A | * | 3/1997 | Linden ........................ 606/177 |
| 5,647,133 A | | 7/1997 | Dassoulas |
| 5,697,279 A | | 12/1997 | Schnizler et al. |
| 5,794,352 A | | 8/1998 | Dassoulas |
| 5,848,474 A | | 12/1998 | Fortney et al. |
| 5,903,983 A | * | 5/1999 | Jungmann et al. ............. 30/392 |
| 6,009,627 A | | 1/2000 | Dassoulas et al. |
| 6,023,848 A | | 2/2000 | Dassoulas et al. |
| 6,112,420 A | | 9/2000 | Schickerling |
| 6,178,646 B1 | | 1/2001 | Schnell et al. |
| 6,209,208 B1 | | 4/2001 | Marinkovich et al. |
| 6,233,833 B1 | | 5/2001 | Grant et al. |
| 6,260,281 B1 | * | 7/2001 | Okumura et al. ............. 30/392 |

(Continued)

*Primary Examiner*—Allan N. Shoap
*Assistant Examiner*—Phong Nguyen
(74) *Attorney, Agent, or Firm*—Brinks Hofer Gilson & Lione; G. Peter Nichols

(57) ABSTRACT

A reciprocating saw is provided having a motor oriented within a housing for operably driving a saw bar and blade holder in a reciprocating motion. The blade holder has a longitudinal slot for receiving a saw blade, and a transverse aperture extending into the longitudinal slot for receiving a follower. A sleeve is pivotally mounted upon the body, and has a circum-axial cam groove formed therein cooperating with the follower. Rotation in a first lock direction urges the follower into the longitudinal slot for engaging the saw blade and rotation of the sleeve in a second unlock direction allows the follower to retract. A biasing member is included for biasing the sleeve in the first lock direction. The sleeve central bore is adapted to provide clearance for the follower such that the sleeve is permitted to axially translate relative to the body for assembly or disassembly of the blade holder.

16 Claims, 10 Drawing Sheets

U.S. PATENT DOCUMENTS

| | | |
|---|---|---|
| 6,276,065 B1 | 8/2001 | Osada et al. |
| 6,295,736 B1 | 10/2001 | Dassoulas et al. |
| 6,638,290 B1 * | 10/2003 | Pascaloff et al. ........... 606/177 |
| 6,725,548 B1 | 4/2004 | Kramer et al. |
| 2002/0014014 A1 | 2/2002 | Dassoulas et al. |
| 2002/0124419 A1 | 9/2002 | Hirabayashi |

* cited by examiner

TOOLLESS BLADE HOLDER FOR A RECIPROCATING TOOL

BACKGROUND OF THE INVENTION

1. Field of the Invention

The present invention relates to a reciprocating tool, more particularly to a toolless blade holder for a reciprocating tool.

2. Background Art

Conventional reciprocating tools have a variety of uses and include a variety of features. Reciprocating tools include reciprocating saws, power chisels, rotary hammer drills, or the like.

Reciprocating saws include multipurpose saws, commonly utilized for demolition purposes due to the convenience and portability provided. Further, reciprocating saws are capable of performing cutting operations in hard to reach locations. Reciprocating saws are also used for woodworking such as a jigsaw used for performing a contoured cut or cutting a pattern into a workpiece.

Prior art reciprocating saws include a saw bar driven in a reciprocating motion and a saw blade coupled therewith. The prior art teaches fastening the saw blade to the saw bar with a threaded fastener engaged with the saw blade and saw bar. This threaded fastener typically secures a blade clamp to the saw bar for clamping the saw blade. Although cost effective, the fastened connection requires a user to have a tool handy in order to change saw blades. This requirement may prove to be inconvenient to a user.

Additionally, the prior art teaches a variety of toolless or quick change blade holders for attaching the saw blade to the saw bar. Although these mechanisms eliminate the requirement of a tool for interchanging saw blades, they are relatively complex and require machined components. These limitations increase the costs for manufacturing, generated by material costs, costs of manufacturing processes and time required to manufacture and assemble the components.

Accordingly, a simplified and cost effective toolless blade holder for a reciprocating tool, which is relatively easy to assemble, is needed for allowing a user to readily and effectively interchange saw blades.

SUMMARY OF THE INVENTION

The present invention provides a reciprocating saw comprising a housing, a motor oriented within the housing, a saw bar oriented within the housing and a blade holder. The saw bar has a forward end proximate to a housing neck portion and is operably driven by the motor in a reciprocating motion. The blade holder is oriented on the forward end of the saw bar such that a user may access the blade holder. The blade holder includes a generally cylindrical body having a longitudinal slot for receiving a saw blade. A transverse aperture extends into the longitudinal slot for receiving a follower oriented therein. A sleeve having a central bore, is mounted upon the body to pivot relative to the body. The sleeve central bore has a circum-axial cam groove formed therein cooperating with the follower. A biasing member biases the sleeve in a rotational direction corresponding with a first lock direction of the circum-axial cam groove for urging the follower into the longitudinal slot for engaging a saw blade complimentary configuration. Rotation of the sleeve in a second unlock direction allows the follower to retract from the longitudinal slot for permitting removal or installation of the saw blade. The sleeve central bore is adapted to provide clearance for the follower such that the sleeve is permitted to axially translate relative to the body for assembly and disassembly of the blade holder.

DETAILED DESCRIPTION OF THE PREFERRED EMBODIMENTS

Figure 1:
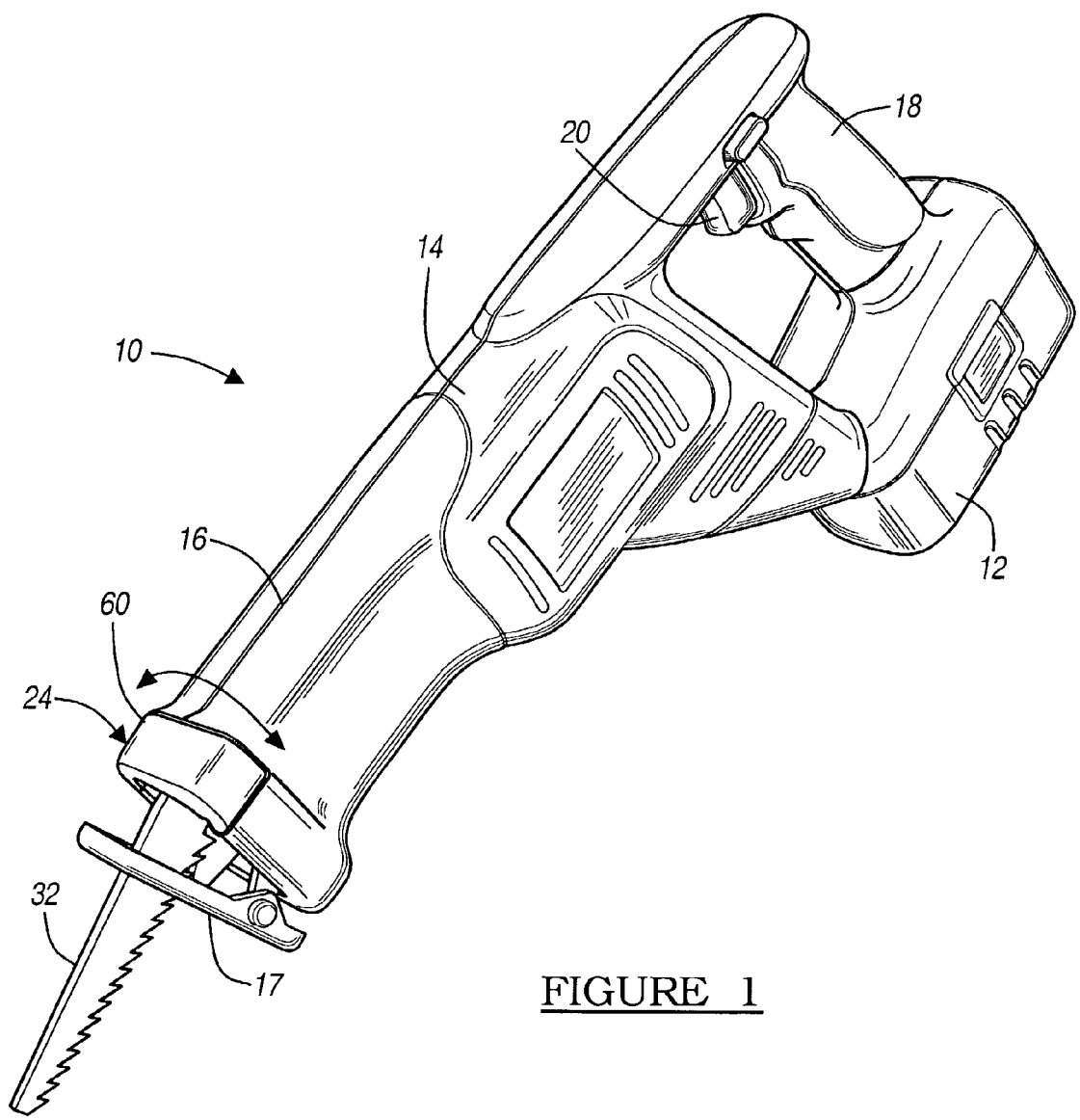
FIG. 1 is a top perspective view of an exemplary embodiment reciprocating saw having a toolless blade holder in accordance with the present invention.

With reference to FIG. 1, an exemplary reciprocating saw is illustrated in accordance with the present invention and referenced generally by numeral 10. The reciprocating saw 10 illustrated is a multi-purpose saw commonly used in demolition. The invention contemplates any reciprocating tool, regardless of intended use. Additionally, the reciprocating saw 10 is illustrated as a cordless reciprocating saw having a battery 12 for a power supply. Of course, the invention contemplates any reciprocating tool regardless of power supply. Accordingly, a woodworking reciprocating saw such as a jigsaw or a corded reciprocating saw are contemplated within the scope of the invention.

The reciprocating saw 10 comprises a housing 14 having a forward neck portion 16 and a handle 18. The handle 18 is sized to cooperate with a user's grip and includes a trigger switch 20 for closing a circuit between the power supply and a motor (not shown) oriented within the housing 14. The forward neck portion 16 is also sized to receive a user's grip, thus providing an auxiliary handle. The forward neck portion 16 includes a pivotal foot 17 for engaging a workpiece during a cutting operation.

Referring now to FIGS. 2–4a, the reciprocating saw 10 includes a saw bar 22 oriented within the housing 14. The saw bar 22 has a forward end proximate to the housing neck portion 16 and may partially extend therefrom. The saw bar 22 is operably connected to, and driven by the motor such that rotation of the motor imparts a reciprocating motion to the saw bar 22. A blade holder 24 is oriented on the forward end of the saw bar 22 such that a user may access the blade holder 24 for interchanging saw blades. The blade holder 24 includes a generally cylindrical body 26 affixed to the saw bar 22. The body 26 may be a separate component, or may be formed integrally with the saw bar 22. The body 26 includes a fastener 28 for securing the body 26 to the saw bar 22.

Of course, the invention contemplates any tool holder for coupling a tool to a reciprocating output bar for imparting reciprocating motion thereto. Accordingly, the tool holder may be configured for securing any tool used in a reciprocating operation, such as a saw blade, a chisel, a masonry drill bit, or the like. Although the invention is illustrated and described with reference to a blade holder for a reciprocating saw, it would be obvious to one having ordinary skill in the art to utilize the present invention for any reciprocating power tool.

The body 26 has a longitudinal slot 30 sized to receive a saw blade 32. Conventional reciprocating saw blades 32 typically include a configuration for securing the saw blade 32 to the blade holder 24. Accordingly, the saw blade 32 has an aperture 34 formed therethrough. The body 26 has a transverse aperture 36 extending into the longitudinal slot 30 and aligned with the saw blade aperture 34. The blade holder 24 includes a follower 38 partially disposed within the body transverse aperture 36 for cooperating with the saw blade aperture 34 for locking the saw blade 32 to the body 26. The follower 38 is illustrated as a pair of ball rollers 40, 40', however, a unitary follower such as a pin having rounded ends may be utilized.

The follower 38 is free to move within the transverse aperture 36 for securing and releasing the saw blade 32. The blade holder 24 includes a sleeve 42, having a central bore 44 sized to pivot about the body 26 and mount thereupon. The sleeve central bore 44 includes a circum-axial cam groove 46 formed therein for cooperating with the follower 38. The circum-axial cam groove 46 may be a cam track, ramp, or the like.

Figure 2:
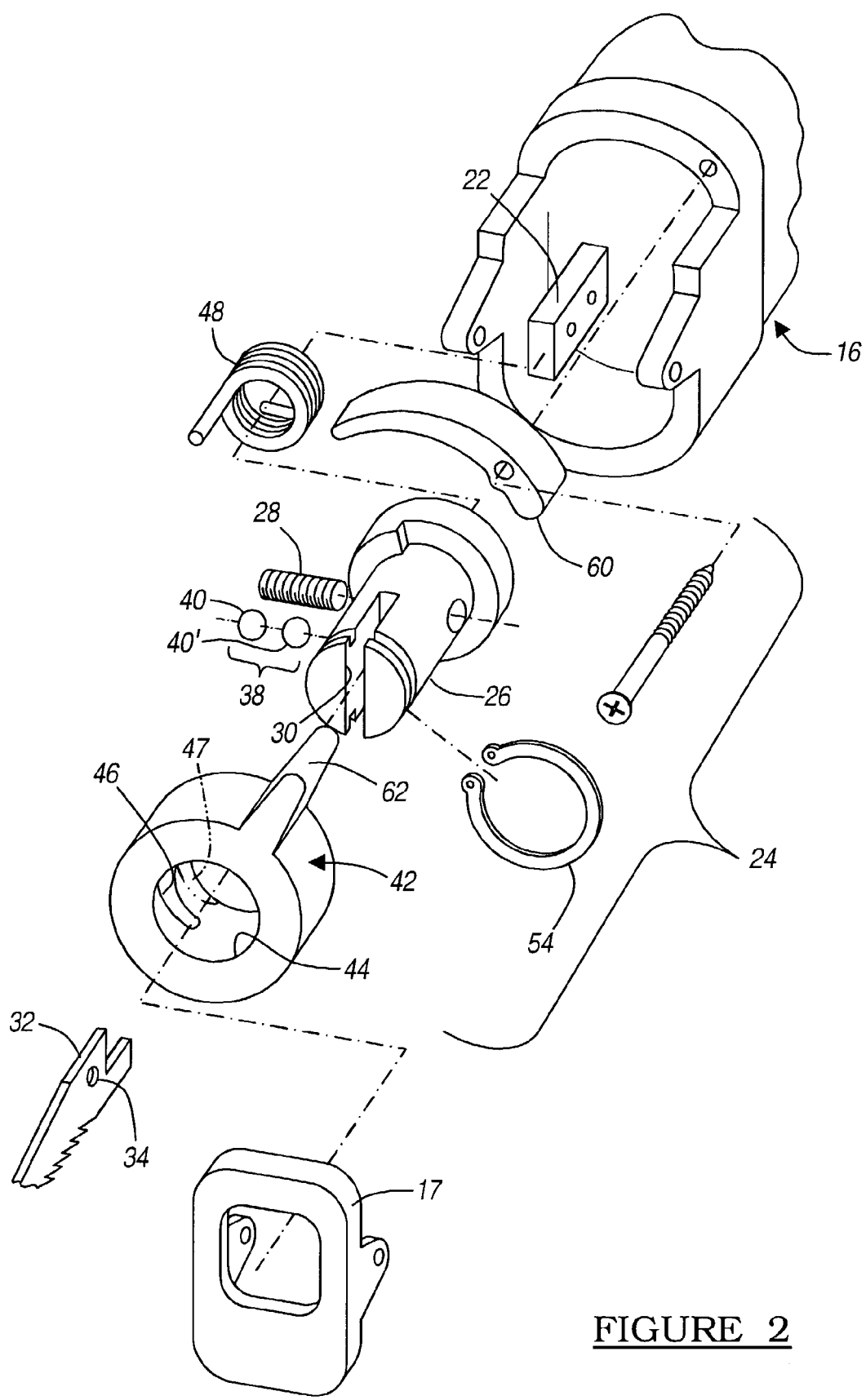
FIG. 2 is an enlarged top perspective exploded view of a forward neck portion, blade holder and saw bar of the reciprocating saw of FIG. 1.

Alternatively, a circum-axial cam groove can be formed at the rearward end of the sleeve central bore 44 as illustrated in phantom in FIG. 2 and referenced by numeral 47. This alternative simplifies the manufacturing process of the sleeve 42, having the rearward circum-axial cam groove 47 oriented at a distal end of the sleeve 42. The rearward circum-axial cam groove 47 provides ease in manufacturing in comparison to the centrally orientated circum-axial cam groove 46. For example, the rearward circum-axial cam groove 47 may be formed into the sleeve 42 by a simplified powder metal forming process including compressing and sintering, thus simplifying the mold, or eliminating a manufacturing step such as machining. Additionally, the rearward circum-axial cam groove 47 eases the assembly process of the blade holder 24 by providing axial clearance for the follower 38.

Figure 4:
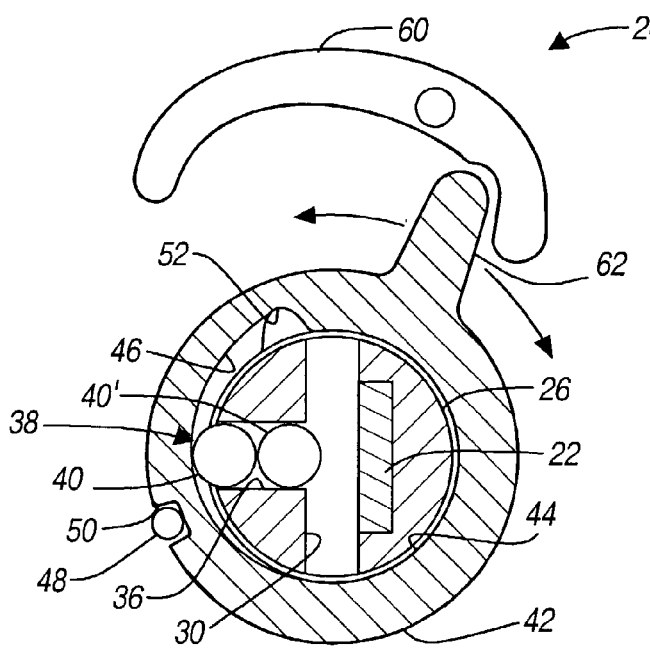
FIG. 4 is a partial section view taken along section line 4—4 in FIG. 3, illustrating a lock position of the blade holder.
Figure 4A:
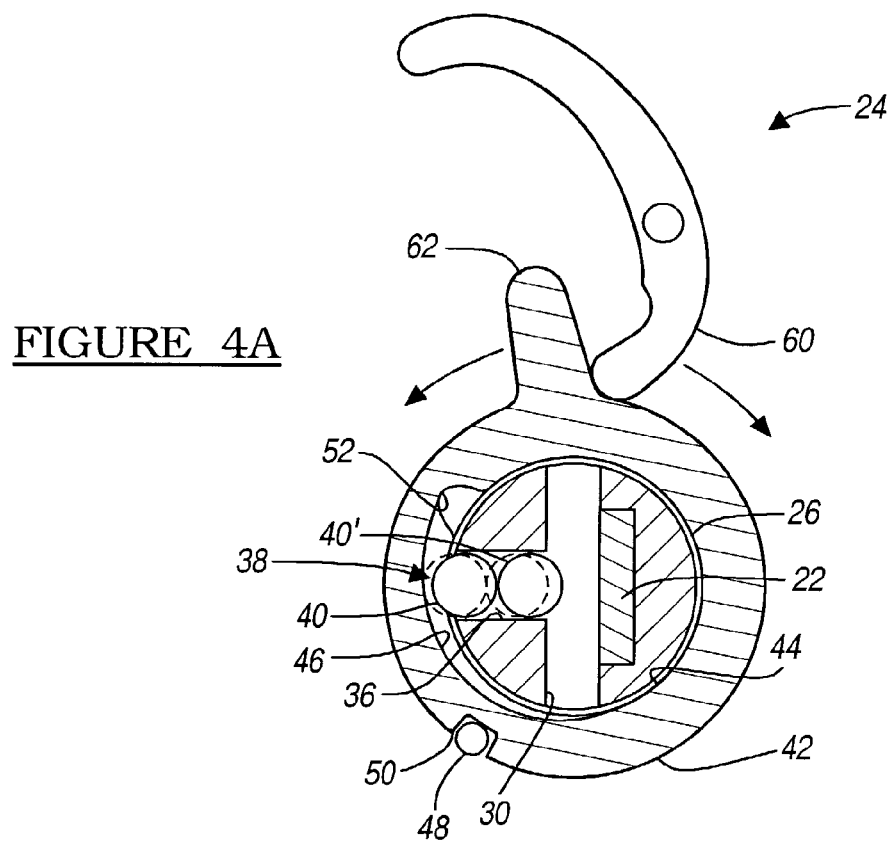
FIG. 4a is a partial section view taken along section line 4a—4a in FIG. 3, illustrating an unlock position of the blade holder.
Figure 4B:
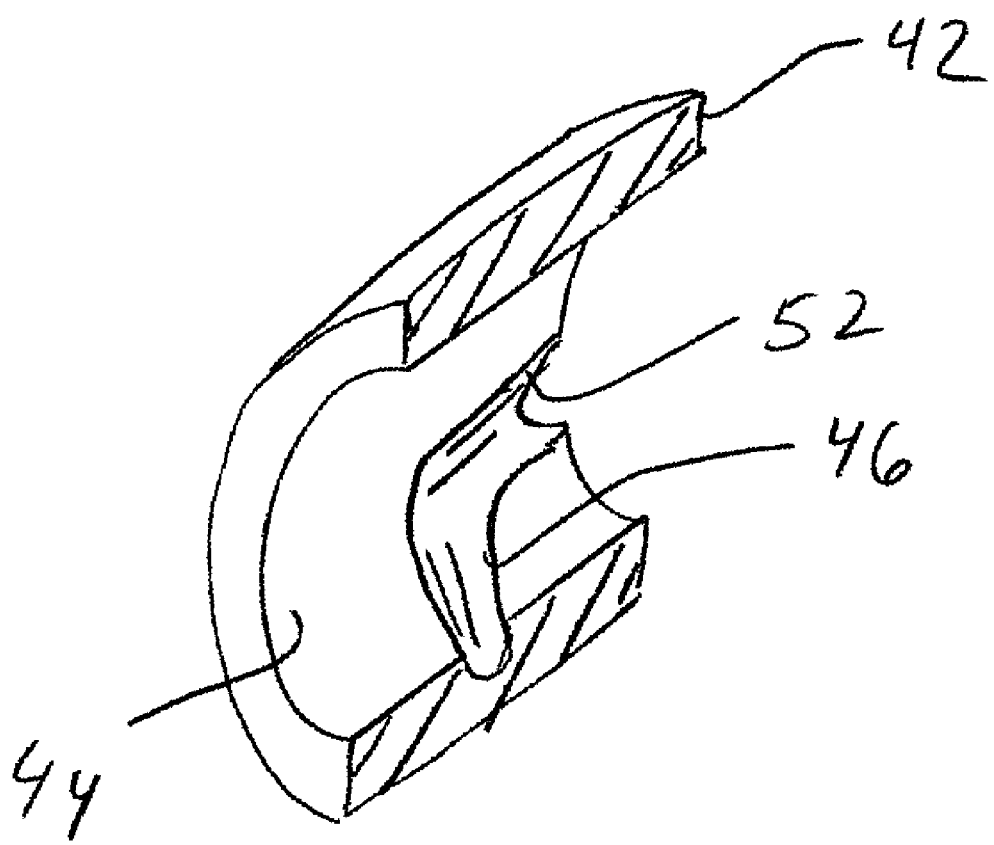
FIG. 4b is a partial section perspective view of a sleeve of the blade holder of FIG. 1.

Referring now to FIGS. 4 to 4b, the sleeve 42 is pivotal about the body 26 for rotation in a first lock direction indicated by the clockwise arrow. In the first lock direction, the circum-axial cam groove 46 narrows, thus urging the follower 38 into the longitudinal slot 30. Accordingly, this position is referred to as a lock position as illustrated in FIG. 4. As the sleeve 42 is rotated in a second unlock direction as indicated by the counterclockwise arrow, the blade holder 24 assumes an unlock position as illustrated in FIG. 4a. The circum-axial cam groove 46 widens as the sleeve 42 is rotated in the unlock direction. The widening circum-axial cam groove 46 provides clearance for the follower 38 to retract from the longitudinal slot 30. The follower 38 may retract from the longitudinal slot 30 as illustrated in phantom, upon removal or insertion of the saw blade 32. In order to maintain the sleeve 42 orientation in the lock position, the blade holder 24 also includes a biasing member such as a torsion spring 48 for continuously urging the sleeve 42 in a clockwise direction in FIG. 4. The torsion spring 48 is connected to the saw bar 22 and engages a recess 50 oriented about the sleeve 42.

Saw blades varying in thickness may be utilized by the blade holder 24. The range of travel of the follower 38 in the transverse aperture 36, in combination with the elastic torsion spring 48, provides a flexible range of variable lock positions in the first lock direction. Of course, the specific saw blade thickness dictates the corresponding lock position.

The first end of the follower 38, or ball roller 40 extends within the circum-axial cam groove 46 in the lock position of the blade holder 24 in the absence of the saw blade 32. Accordingly, the follower 38 prevents axial translation of the sleeve 42 relative to the body 26 in both the lock and unlock positions. The sleeve central bore 44 further includes a longitudinal channel 52 formed therein. The longitudinal channel 52 intersects the circum-axial cam groove 46 and is oversized relative to the follower 38. In order to assemble or disassemble the blade holder 24, a user aligns the intersection of the longitudinal channel 52 and circum-axial cam groove 46 with the follower 38 for installing or removing the sleeve 42. Once assembled, a snap ring 54 may be affixed to the body 26 adjacent to a forward surface of the sleeve 42 for preventing inadvertent disassembly of the blade holder 24.

Alternatively, in the lock position, the follower 38 may be completely displaced within the transverse aperture 36 and longitudinal slot 30 such that ball roller 40 does not protrude from the body 26. Therefore, sleeve 42 may be slid axially over the body 26 without requiring the longitudinal channel 52. Also, the rearward circum-axial cam groove 47 eliminates the requirement of the longitudinal channel 52. In these alternatives, the snap ring 54 or any retaining member is desired to maintain the axial position of the sleeve 42, once assembled.

Figure 3:
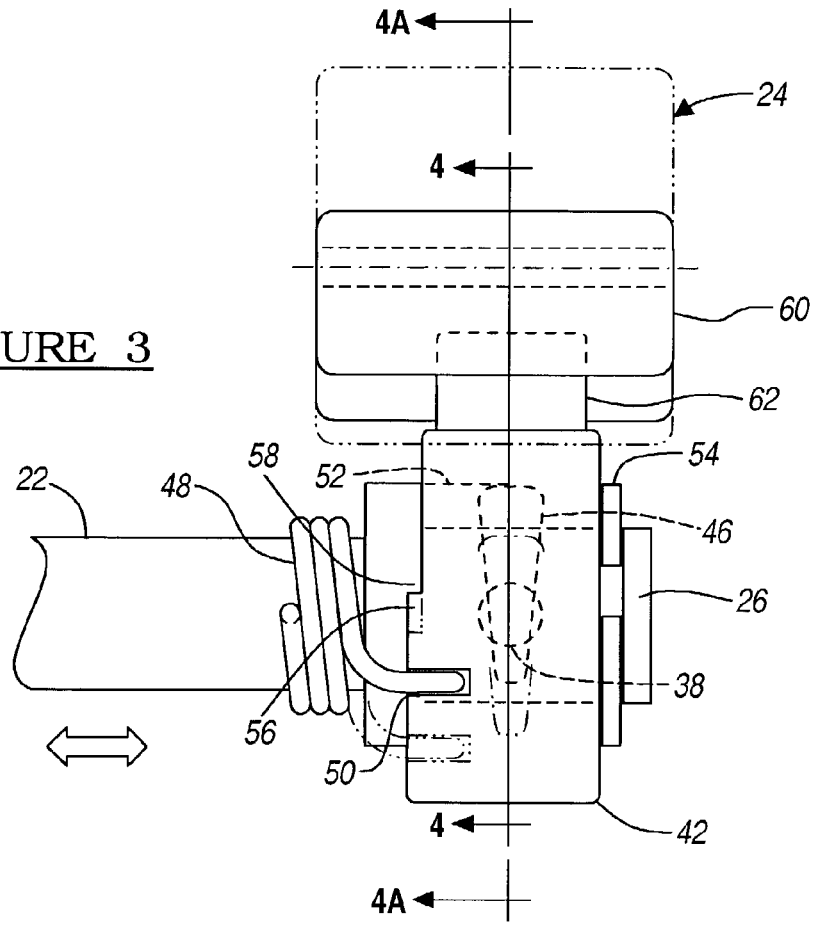
FIG. 3 is an enlarged left side, fragmentary elevation view of the blade holder and saw bar of FIG. 1.

The sleeve 42 has a limited range of rotation relative to the body 26 for continuous engagement of the follower 38 and circum-axial cam groove 46. The body 26 includes a step 56 and the sleeve 42 includes a corresponding step 58, as illustrated in FIG. 3, to prevent the torsion spring 48 from biasing the sleeve 42 past a prescribed radial orientation. Thus, in the absence of the saw blade 32, the sleeve 42 does not significantly surpass the lock position. The housing 14 and sleeve 42 may include similar configurations for limiting rotation in the second unlock direction.

The blade holder 24 includes an unlock lever 60 pivotally connected to the forward neck portion 16 of the housing 14. The unlock lever 60 may be actuated by a user for engaging a radially extending tab 62 affixed to the sleeve 42. As the user pivots the unlock lever 60, it engages the tab 62 and rotates it in the second unlock direction. The unlock lever 60 and tab 62 cooperate such that the lever 60 imparts a maximum displacement to the tab 62 that does not exceed the unlock position. This feature prevents a user from over rotating the sleeve 42. Accordingly, the intersection of the longitudinal channel 52 and the circum-axial cam groove 46 is oriented outside the range of rotation of the sleeve 42 to prevent inadvertent disassembly of the sleeve 42. Further, the tab 62 is oriented such that it does not contact the lever 60 in the lock position of the sleeve 42. This prevents reciprocating contact between the sleeve 42 and lever 60. The lever 60 may also be biased by a torsion spring (not shown) to maintain the non-contacting orientation relative to the sleeve tab 62.

The blade holder 24 of the present invention is cost effective relative to prior art blade holders. Blade holder 24 requires a minimal amount of components thus reducing manufacturing costs. The blade holder 24 also provides advantages in assembly for further limiting manufacturing costs. Additionally, the blade holder 24 reduces the amount of machined components. For example, the sleeve 42 may be formed by a powder metal process, thus eliminating the high costs of machining the component.

Figure 5:
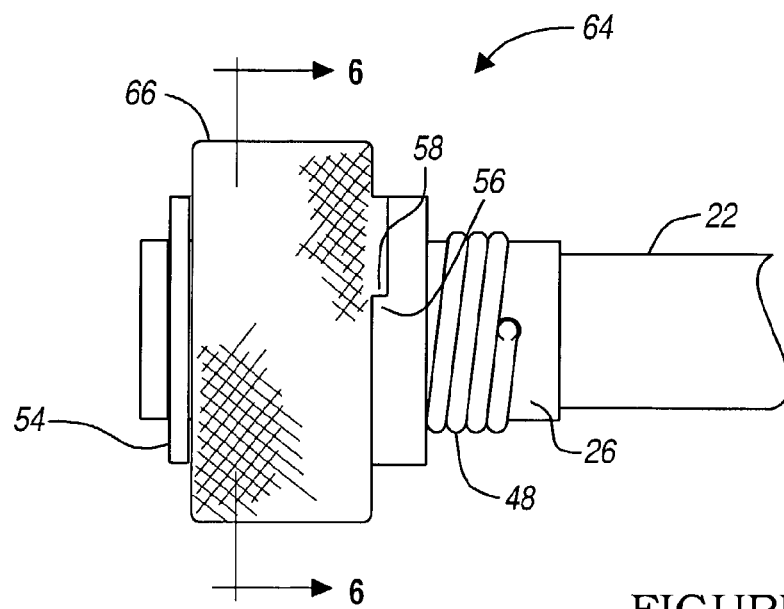
FIG. 5 is a right side elevation view of an alternative embodiment blade holder and saw bar.
Figure 6:
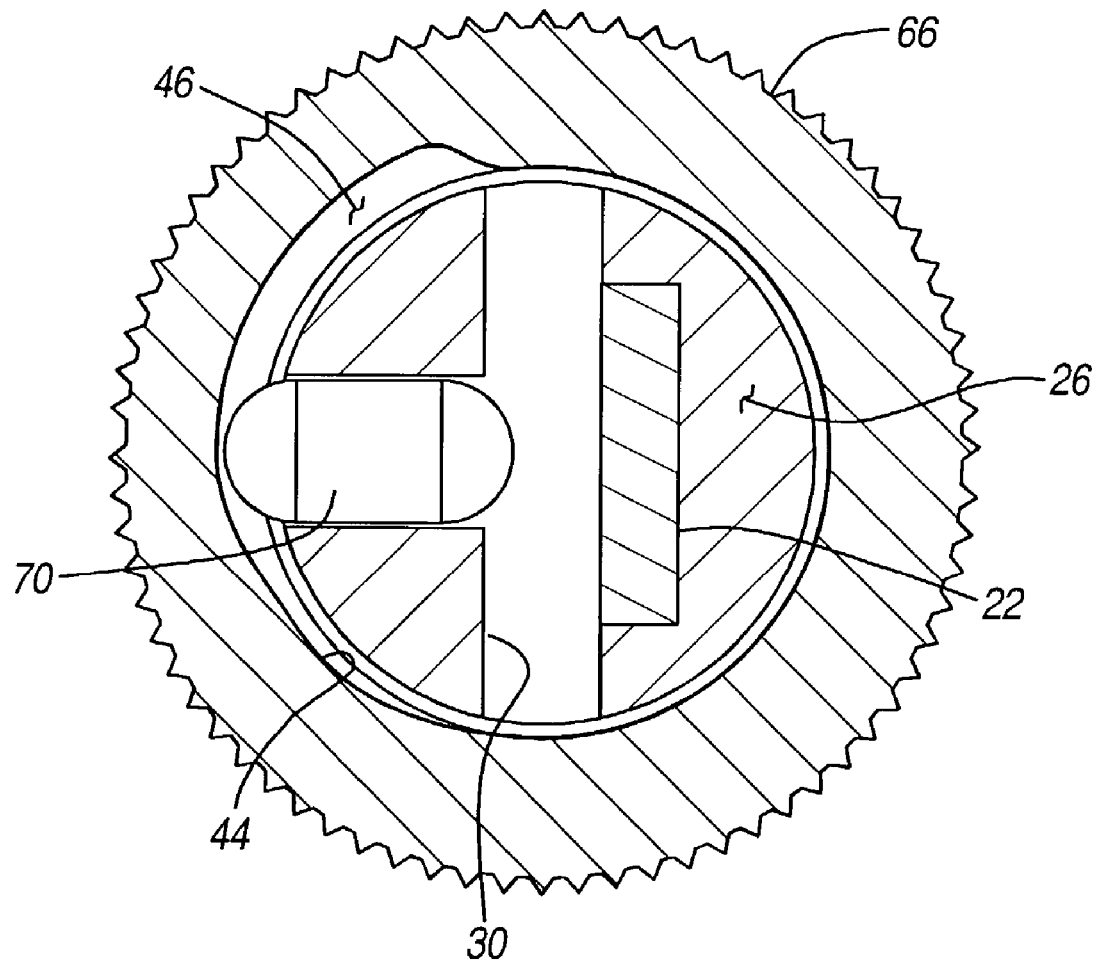
FIG. 6 is a partial section view taken along section line 6—6 in FIG. 5.

With reference now to FIGS. 5 and 6, an alternative embodiment blade holder 64 is illustrated in accordance with the present invention. Like elements retain same reference numerals, wherein new elements are assigned new reference numerals. The blade holder 64 includes a sleeve 66 having an externally knurled surface such that a user may grip and impart rotation thereto. Rotation in the first lock direction is limited by the step 56 formed to the body 26 and the corresponding step 58 formed to the sleeve 66. The step 58 may limit the rotation of the sleeve 66 to both the lock and unlock positions.

Blade holder 64 uses a pin 70 as a follower instead of a pair of ball rollers described with reference to the first embodiment. In this embodiment, no channel is formed on the inside diameter of sleeve 66. When the pin 70 is in its inwardmost position, sleeve 66 can be axially removed from body 26 with snap ring 54 removed. If necessary, the blade holder can be removed from saw bar 22 if additional follower movement is needed to remove or install sleeve 66.

Figure 7:
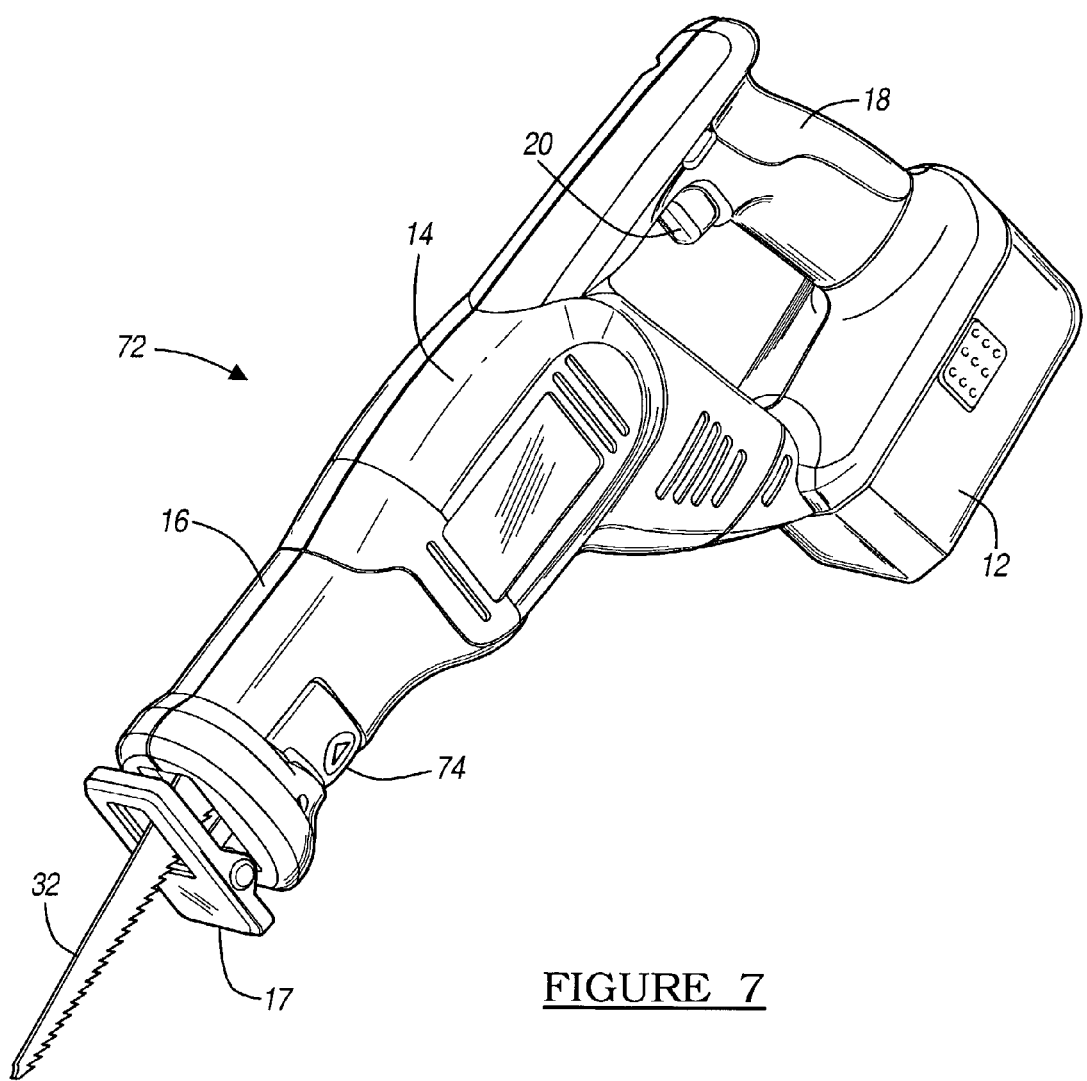
FIG. 7 is a top perspective view of another alternative embodiment reciprocating saw having a toolless blade holder in accordance with the present invention.

Referring now to FIGS. 7–9c, an alternative embodiment reciprocating saw is illustrated and referenced generally by reference numeral 72. Once again similar elements retain the same reference numerals wherein new elements are assigned new reference numerals. The reciprocating saw 72 includes an unlock lever 74 spaced away from the distal end of the forward neck portion 16, and secluded from the operating region of the reciprocating saw 72 as illustrated in FIG. 7.

Figure 8:
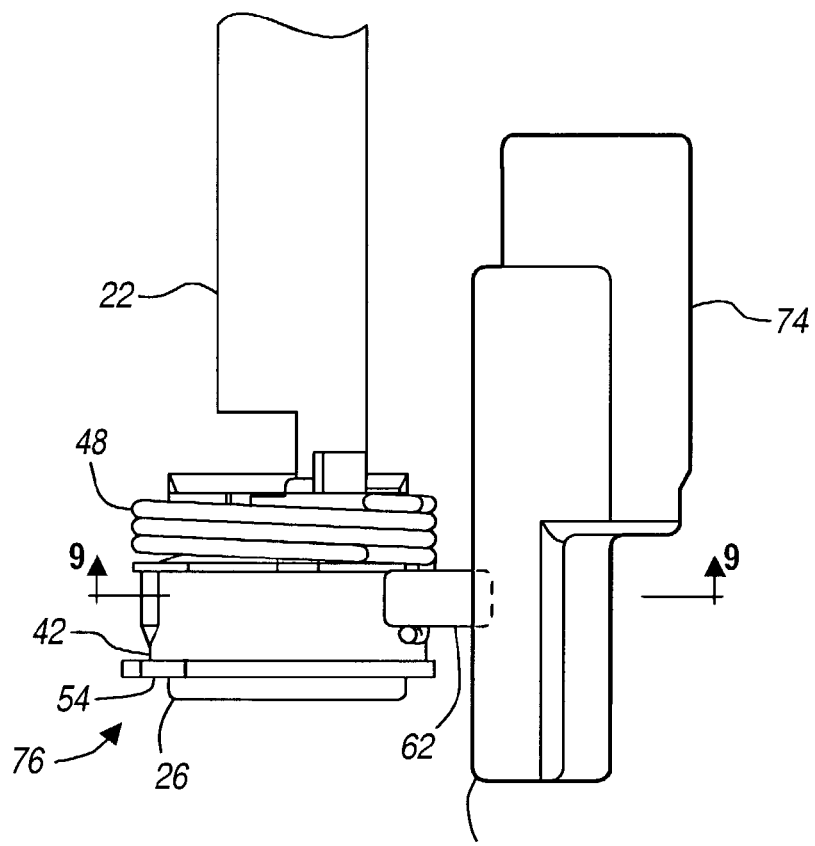
FIG. 8 is an enlarged top plan view of the blade holder and saw bar of the reciprocating saw of FIG. 7.

With reference now to FIG. 8, a preferred embodiment blade holder 76 is illustrated mounted to the saw bar 22. The unlock lever 74 is illustrated having an elongate contact portion 78 for engaging the tab 62 and subsequently urging the sleeve 42 in the first unlock direction. The contact portion 78 has an overall length adequate to contact the tab 62 regardless of the saw bar 22 orientation. This feature overcomes difficulties, particularly in prior art blade holders which did not include an unlock lever. These prior art blade holders require the blade holder to be oriented in a forwardmost position in order for the user to manipulate the blade holder.

The sleeve 42 of the blade holder 76 includes a rearward circum-axial cam groove 47 resulting in a generally compact blade holder 76 and eliminating the requirement of a longitudinal channel. Also, a pair of ball rollers 40,40' is illustrated in comparison to a pin due to the reduced friction provided in the rolling engagement with the rearward circum-axial cam groove 47. The reduced friction minimizes wear on the blade holder 76.

Figure 9:
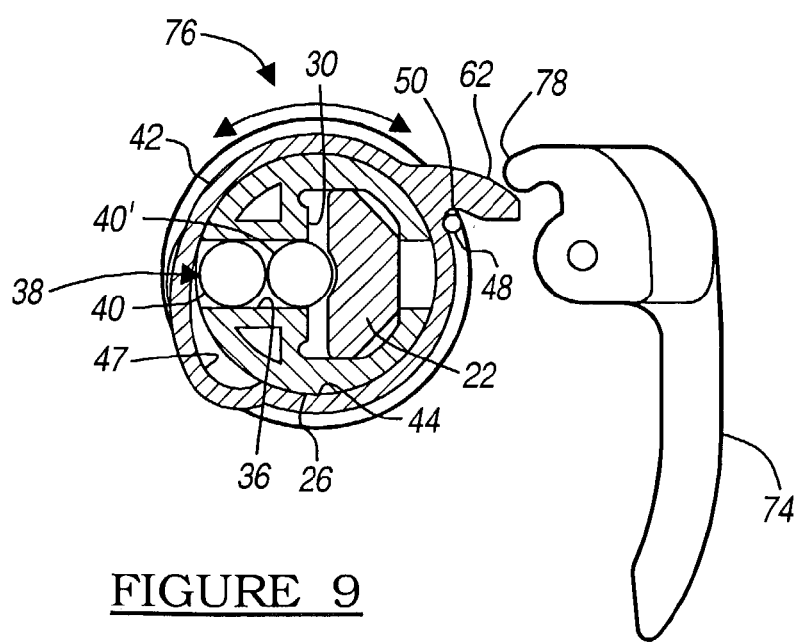
FIG. 9 is a partial section view taken along section line 9—9 in FIG. 8, illustrating a lock position of the blade holder in the absence of a saw blade.

As illustrated in FIG. 9, in the absence of a saw blade 32, the follower 38 engages the saw bar 22 and rearward circum-axial cam groove 47, thus preventing any further rotation in the first lock direction indicated by the counter-clockwise arrow acting as a radial stop. This engagement acts as a limit in the range of motion of the sleeve 42 relative to the body 26.

Figure 9A:
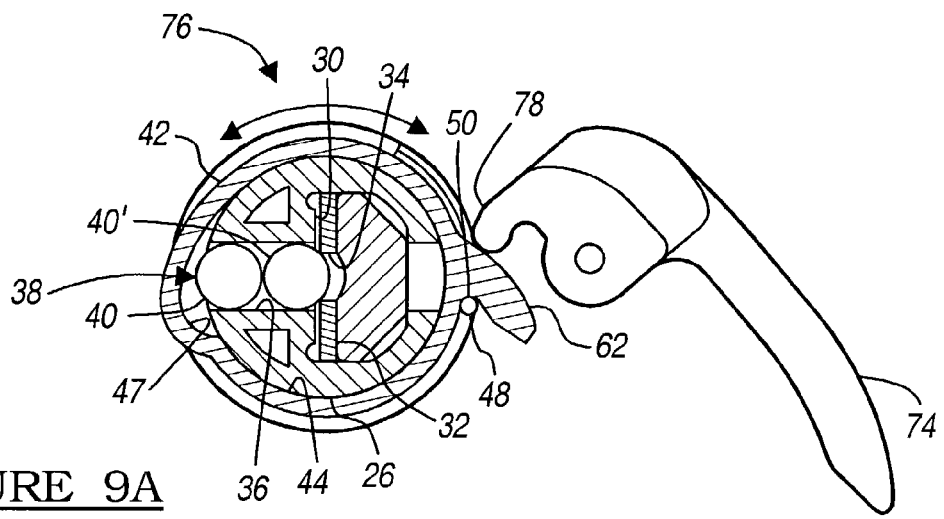
FIG. 9a is a partial section view taken along section line 9—9 in FIG. 8, illustrating a lock position of the blade holder securing a saw blade to the saw bar.

Referring to FIG. 9a, the blade holder 76 is illustrated in a lock position in cooperation with the saw blade 32. The lock position is dictated by a radial orientation of the sleeve 42, wherein the rearward circum-axial cam groove 47 engages the follower 38 and the follower 38 in turn engages the saw blade 32. Of course, various saw blade thicknesses are contemplated, and therefore, various lock positions may be achieved within the elastic range permitted by the torsion spring 48. The tab 62 and unlock lever contact portion 78 are adequately sized to cooperate regardless of the lock position of the sleeve 42. FIG. 9a illustrates the orientation of the unlock lever 74 required to initiate contact with the tab 62 for the particular thickness of the exemplary saw blade 32.

Figure 9B:
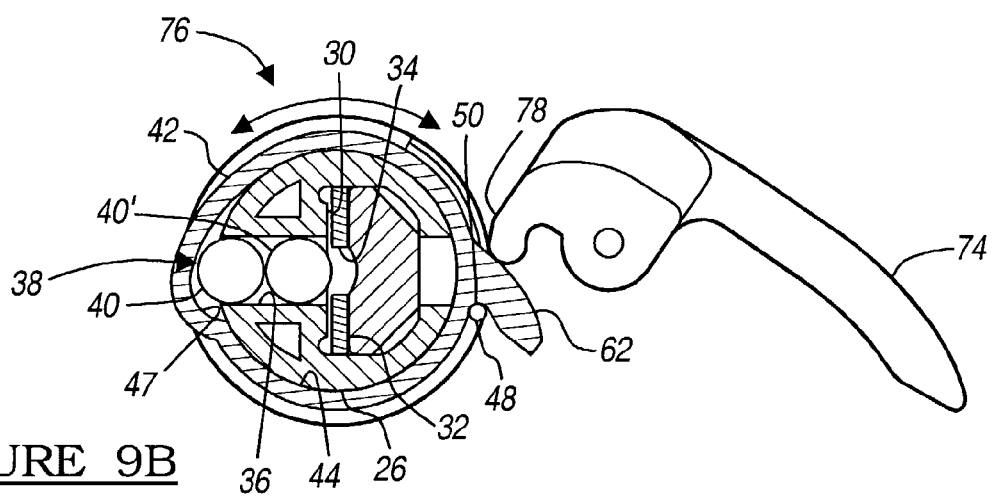
FIG. 9b is a partial section view taken along section line 9—9 in FIG. 8, illustrating an intermediate position of the blade holder.

FIG. 9b illustrates an intermediate position of the blade holder 76 prescribed by the cooperation of the sleeve 42 and unlock lever 74 between the lock and unlock positions. As the unlock lever 74 is further rotated by the user, the contact portion 78 urges the tab 62 and sleeve 42 in the second unlock direction indicated by the clockwise arrow, thus releasing the engagement of the follower 38 with the saw blade 32.

Figure 9C:
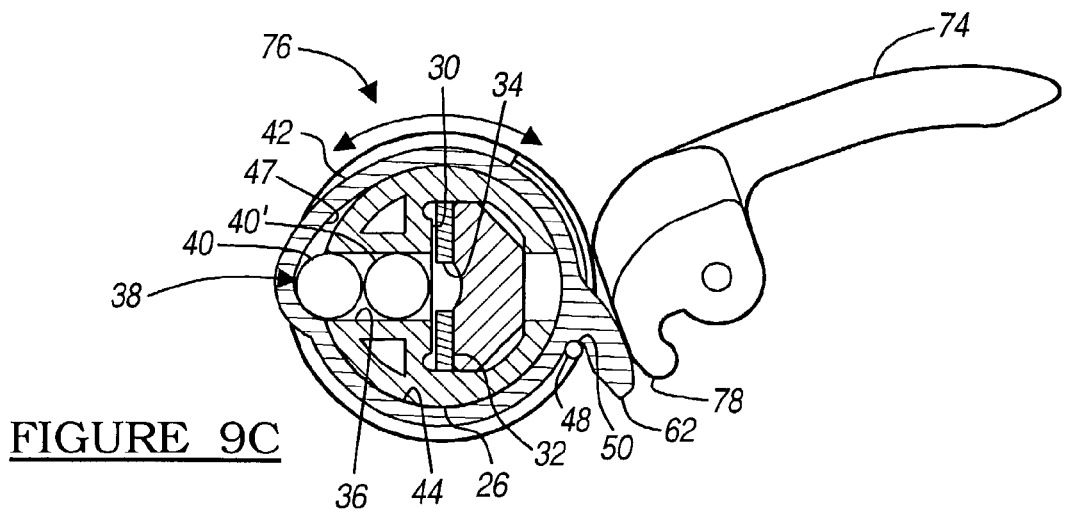
FIG. 9c is a partial section view taken along section line 9—9 in FIG. 8, illustrating an unlock position of the blade holder.

Referring now to FIG. 9c, the blade holder 76 is illustrated in an unlock position wherein the sleeve 42 is completely rotated in the second unlock direction. The tab 62 and contact portion 78 are adapted to engage in such a manner that the orientation of the unlock lever 74 is stabilized. This feature can be achieved by a frictional engagement of the tab 62 and contact portion 78 sufficient to overcome the bias of the torsion spring 48. Alternatively, the contact portion 78 may cammingly engage the tab 62, as illustrated, such that the direction of the reaction moment on the unlock lever 74 is reversed. For example, the reaction moment experienced by the unlock lever 74 during unlocking, see FIG. 9b, is clockwise with respect to the axis about which the unlock lever 74 pivots. Due to the geometries of the tab 62 and contact portion 78, the direction of the force applied to contact portion 78 surpasses the pivotal axis of the unlock lever 74 at the stabilized unlock position. Therefore, the reaction moment experienced by the unlock lever 74 is reversed, thus biasing the unlock lever 74 in the counter-clockwise direction relative to its pivotal axis.

The unlock lever 74 stabilizes the sleeve 42 in this position so that a user may release its grip upon the unlock lever 74. Therefore, the user may interchange saw blades 32 without having to maintain a grip on the unlock lever 74. Once the saw blades 32 are interchanged or removed, the user merely urges the unlock lever 74 in a direction opposite of that for unlocking, clockwise in FIG. 9c. The rotation of the unlock lever 74 removes the stabilized engagement of the tab 62 and contact portion 78 such that the sleeve 42, driven by the torsion spring 48, may rotate to a lock position as dictated by the presence and thickness of the saw blade 32.

Figure 10:
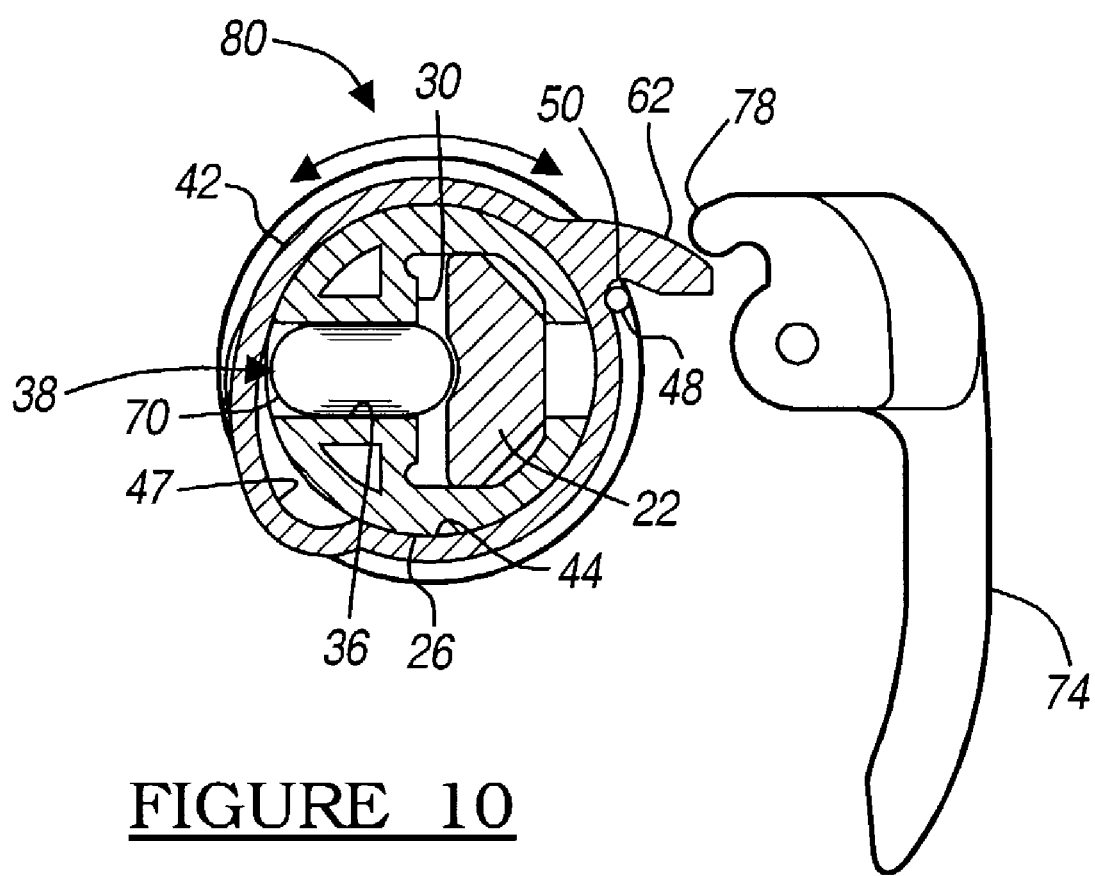
FIG. 10 is a partial section view of a preferred embodiment blade holder in accordance with the present invention, illustrating a lock position of the blade holder in the absence of a saw blade.

With reference now to FIG. 10, a preferred embodiment blade holder 80 is illustrated in accordance with the present invention. The blade holder 80 is similar to the previous embodiment, however, a pin 70 is utilized as the follower 38, rather than a pair of ball rollers 40, 40'. The pin 70 is received within the transverse aperture 36 of the body 26. The pin cooperates with the rearward circum-axial cam 47 of the sleeve 42, such that rotation of the sleeve 42 causes the pin 70 to lock or unlock the saw blade 32. The body 26 is adapted to be fastened or secured to the saw bar 22 of a reciprocating saw 72, illustrated in FIG. 7. Accordingly, the preferred blade holder 80 operates in the manner described in the prior embodiment with reference to FIGS. 7–9c. The pin 70 offers the advantages of having less components, thus simplifying the assembly process and reducing manufacturing costs.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A reciprocating saw comprising:
a housing having a forward neck portion and a handle;
a motor oriented within the housing;
a saw bar oriented within the housing, the saw bar having a forward end proximate to the housing neck portion, the saw bar being operably driven by the motor in a reciprocating motion;
a blade holder oriented on the forward end of the saw bar such that a user may access the blade holder, the blade holder having:
a generally cylindrical body having a longitudinal slot sized to receive a saw blade, and a transverse aperture extending into the longitudinal slot,
a follower oriented within the body transverse aperture,
a sleeve having a central bore sized to mount upon and pivot relative to the body, the sleeve central bore having a circum-axial cam groove formed therein cooperating with the follower, and
a biasing member elastically biasing the sleeve to rotate in a lock direction causing the circum-axial cam groove to urge the follower inward to engage the saw blade inserted therein to removably secure the saw blade to the saw bar, and rotation of the sleeve in an unlock direction provides clearance within the circum-axial cam groove to allow the follower to retract from the saw blade and free the saw blade: and
a retaining member affixed to a distal end of the body beyond the sleeve for securing the sleeve to the body;
wherein the sleeve central bore is adapted to provide clearance for the follower such that the sleeve is permitted to axially translate relative to the body for assembly or disassembly of the blade holder;
wherein the follower has a first end for cooperating with the circum-axial cam groove and a second end for engaging the saw blade, and the sleeve has a longitudinal channel intersecting the circum-axial cam groove and being sized relative to the follower first end so that the sleeve may axially translate relative to the body at a radial orientation of the sleeve that aligns the intersection of the channel with the follower first end; and
wherein the sleeve has a limited range of rotation relative to the body, and the intersection of the circum-axial cam groove and channel aligns with the follower first end at a radial orientation of the sleeve that is outside the sleeve rotation range.

2. The reciprocating saw of claim 1, wherein the follower is further defined as a pair of ball rollers in stacked alignment within the transverse aperture.

3. The reciprocating saw of claim 1, wherein the follower is further defined as an elongate pin with rounded ends.

4. The reciprocating saw of claim 1, wherein the sleeve has a range of rotation limited in the lock direction by a radial stop.

5. A reciprocating saw comprising:
a housing having a forward neck portion and a handle;
a motor oriented within the housing;
a saw bar oriented within the housing, the saw bar having a forward end proximate to the housing neck portion, the saw bar being operably driven by the motor in a reciprocating motion;
a blade holder oriented on the forward end of the saw bar such that a user may access the blade holder, the blade holder having:
a generally cylindrical body having a longitudinal slot sized to receive a saw blade, and a transverse aperture extending into the longitudinal slot,
a follower oriented within the body transverse aperture and,
a sleeve having a central bore sized to mount upon and pivot relative to the body, the sleeve central bore having a circum-axial cam groove formed therein cooperating with the follower, wherein the follower has a first end for cooperating with the circum-axial cam groove and a second end for engaging the saw blade, and the sleeve has a longitudinal channel intersecting the circum-axial cam groove and being sized relative to the follower first end so that the sleeve may axially translate relative to the body at a radial orientation of the sleeve that aligns the intersection of the channel with the follower first end, and
a biasing member elastically biasing the sleeve to rotate in a lock direction causing the circum-axial cam groove to urge the follower inward to engage the saw blade inserted therein to removably secure the saw blade to the saw bar, and rotation of the sleeve in an unlock direction provides clearance within the circum-axial cam groove to allow the follower to retract from the saw blade and free the saw blade; and
a retaining member affixed to a distal end of the body beyond the sleeve for securing the sleeve to the body;
wherein the sleeve central bore is adapted to provide clearance for the follower such that the sleeve is permitted to axially translate relative to the body for assembly or disassembly of the blade holder; and
wherein the sleeve further includes a radial extending tab and further comprising an unlock lever pivotally connected to the housing for cooperating with the tab for permitting a user to impart rotation to the sleeve in the unlock direction of the circum-axial cam groove relative to the follower.

6. The reciprocating saw of claim 5, wherein the follower is further defined as a pair of ball rollers in stacked alignment within the transverse aperture.

7. The reciprocating saw of claim 5, wherein the follower is further defined as an elongate pin with rounded ends.

8. A reciprocating saw comprising:
a housing having a forward neck portion and a handle;
a motor oriented within the housing;
a saw bar displaced within the housing, the saw bar having a forward end proximate to the housing neck portion, the saw bar being operably driven by the motor in a reciprocating motion;

a blade holder oriented on the forward end of the saw bar such that a user may access the blade holder, the blade holder having:
- a generally cylindrical body having a longitudinal slot sized to receive a saw blade, and a transverse aperture extending into the longitudinal slot,
- a follower oriented within the body transverse aperture,
- a sleeve having a central bore sized to mount upon and pivot relative to the body, the sleeve central bore having a circum-axial cam groove formed therein cooperating with the follower,
- a biasing member elastically biasing the sleeve to rotate in a lock direction causing the circum-axial cam groove to urge the follower inward to engage the saw blade inserted therein to removably secure the saw blade to the saw bar, and rotation of the sleeve in an unlock direction provides clearance within the circum-axial cam groove to allow the follower to retract from the saw blade and free the saw blade; and an unlock mechanism attached to the housing and operably connected to the sleeve for permitting a user to impart rotation to the sleeve in the unlock direction of the circum-axial cam groove relative to the follower wherein the unlock mechanism has a stabilized unlock position for cooperating with the sleeve and maintaining an orientation of the sleeve in the unlock direction absent a manually applied force.

9. The reciprocating saw of claim 8, wherein the follower is further defined as a pair of ball rollers in stacked alignment within the transverse aperture.

10. The reciprocating saw of claim 8, wherein the follower is further defined as an elongate pin with rounded ends.

11. The reciprocating saw of claim 8, wherein the sleeve has a range of rotation limited in the lock direction by a radial stop.

12. The reciprocating saw of claim 8, further comprising a retaining member affixed to a distal end of the body beyond the sleeve for securing the sleeve to the body.

13. The reciprocating saw of claim 8, wherein the follower has a first end for cooperating with the circum-axial cam groove and a second end for engaging the saw blade, and the sleeve has a longitudinal channel intersecting the circum-axial cam groove and being sized relative to the follower first end so that the sleeve may axially translate relative to the body at a radial orientation of the sleeve, that aligns the intersection of the channel with the follower first end.

14. The reciprocating saw of claim 8, wherein the sleeve is limited to a range of rotation relative to the body, and the intersection of the circum-axial cam groove and channel aligns with the follower first end at a radial orientation of the sleeve that is outside the sleeve rotation range.

15. The reciprocating saw of claim 8, wherein the sleeve further includes a radial extending tab, and the unlock mechanism is further defined as an unlock lever pivotally connected to the housing for cooperating with the tab.

16. The reciprocating saw of claim 15, wherein the sleeve has a range of rotation limited in the unlock direction by an orientation of the lever that imparts a maximum rotary movement of the tab relative to the body.

* * * * *